US006819991B2

United States Patent
Rao et al.

(10) Patent No.: US 6,819,991 B2
(45) Date of Patent: Nov. 16, 2004

(54) VEHICLE SENSING BASED PRE-CRASH THREAT ASSESSMENT SYSTEM

(75) Inventors: Manoharprasad K. Rao, Novi, MI (US); Kwaku O. Prakah-Asante, Commerce Township, MI (US); Md Abul Masrur, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 09/995,504

(22) Filed: Nov. 29, 2001

(65) Prior Publication Data

US 2004/0111200 A1 Jun. 10, 2004

(51) Int. Cl.[7] .................... B60R 21/32; G06F 19/00; G06F 7/00
(52) U.S. Cl. .................... 701/45; 701/301; 340/903; 280/735; 180/274
(58) Field of Search .................... 701/45, 301, 1; 280/733, 806, 728.1; 342/70, 72; 340/435, 436, 903; 702/143; 700/304

(56) References Cited

U.S. PATENT DOCUMENTS

| | | | |
|---|---|---|---|
| 3,514,610 A | 5/1970 | Huston et al. | |
| 4,257,703 A | 3/1981 | Goodrich | |
| 4,381,829 A | 5/1983 | Montaron | |
| 4,623,966 A | 11/1986 | O'Sullivan | |
| 4,638,289 A | 1/1987 | Zottnik | |
| 4,673,937 A | 6/1987 | Davis | |
| 4,833,469 A | 5/1989 | David | |
| 4,916,450 A | 4/1990 | Davis | |
| 4,969,103 A | 11/1990 | Maekawa | |
| 4,992,943 A | 2/1991 | McCracken | |
| 4,994,972 A | 2/1991 | Diller | |
| 5,040,118 A | 8/1991 | Diller | |

(List continued on next page.)

FOREIGN PATENT DOCUMENTS

| | | |
|---|---|---|
| EP | 0720928 A2 | 10/1996 |
| JP | 54-65934 A | 5/1979 |
| WO | WO 98/37435 | 8/1998 |
| WO | WO 98/58274 | 12/1998 |

Primary Examiner—Thomas G. Black
Assistant Examiner—Ronnie Mancho
(74) Attorney, Agent, or Firm—Frank A. MacKenzie

(57) ABSTRACT

A pre-crash assessment system 1 includes a host vehicle 3 in motion. A remote sensor 4, status monitoring sensors 5, and safety device actuators are coupled to the host object. The remote sensor 4 detects target object dynamics. The status monitoring sensors 5 detect host object dynamics. The safety device actuators activate safety devices. A threshold for each safety device actuator is defined by a safety device activation specification. A safety device controller 10, also coupled to the host object, generates tracking signals based on host object and target object dynamics. The safety device controller 10 also estimates future positions of the host and target objects, and estimates whether the potential for crash between the host and target objects is within the threshold criteria for specific safety device actuation. The controller 10 then controls the safety device actuators when the potential for crash is within the pre-determined threshold criteria.

19 Claims, 3 Drawing Sheets

U.S. PATENT DOCUMENTS

| | | |
|---|---|---|
| 5,063,603 A | 11/1991 | Burt |
| 5,091,726 A | 2/1992 | Shyu |
| 5,162,794 A | 11/1992 | Seith |
| 5,166,881 A | 11/1992 | Akasu |
| 5,173,859 A | 12/1992 | Deering |
| 5,182,459 A | 1/1993 | Okano et al. |
| 5,230,400 A | 7/1993 | Kakinami et al. |
| 5,234,071 A | 8/1993 | Kajiwara |
| 5,249,157 A | 9/1993 | Taylor |
| 5,307,136 A | 4/1994 | Saniyoshi |
| 5,314,037 A | 5/1994 | Shaw et al. |
| 5,430,432 A | 7/1995 | Camhi et al. |
| 5,467,283 A | 11/1995 | Butsuen et al. |
| 5,479,173 A | 12/1995 | Yoshioka et al. |
| 5,502,432 A | 3/1996 | Ohmamyuda et al. |
| 5,521,580 A | 5/1996 | Kaneko et al. |
| 5,526,269 A | 6/1996 | Ishibashi et al. |
| 5,534,870 A | 7/1996 | Avignon et al. |
| 5,541,590 A | 7/1996 | Nishio |
| 5,552,986 A | 9/1996 | Omura et al. |
| 5,572,428 A | 11/1996 | Ishida et al. |
| 5,574,463 A | 11/1996 | Shirai et al. |
| 5,594,414 A | 1/1997 | Namngani |
| 5,602,760 A | 2/1997 | Chacon et al. |
| 5,604,683 A | 2/1997 | Roecker |
| 5,629,847 A | 5/1997 | Shirakawa et al. |
| 5,635,922 A | 6/1997 | Cho et al. |
| 5,646,612 A | 7/1997 | Byon |
| 5,680,097 A | 10/1997 | Uemura et al. |
| 5,684,474 A | 11/1997 | Gilon et al. |
| 5,689,264 A | 11/1997 | Ishikawa et al. |
| 5,699,040 A | 12/1997 | Matsuda |
| 5,699,057 A | 12/1997 | Ikeda et al. |
| 5,710,565 A | 1/1998 | Shirai et al. |
| 5,745,870 A | 4/1998 | Yamamoto et al. |
| 5,748,477 A | 5/1998 | Katoh |
| 5,749,426 A | 5/1998 | Gilling |
| 5,751,211 A | 5/1998 | Shirai et al. |
| 5,751,836 A | 5/1998 | Wildes et al. |
| 5,754,099 A | 5/1998 | Nishimura et al. |
| 5,771,481 A | 6/1998 | Gilling |
| 5,779,264 A | 7/1998 | Demesseman et al. |
| 5,808,561 A | 9/1998 | Kinoshita et al. |
| 5,815,093 A | 9/1998 | Kikinis |
| 5,835,007 A | 11/1998 | Kosiak |
| 5,835,873 A | 11/1998 | Darby et al. |
| 5,838,228 A | 11/1998 | Clark |
| 5,847,472 A | 12/1998 | Byon |
| 5,847,755 A | 12/1998 | Wixson et al. |
| 5,872,536 A | 2/1999 | Lyons et al. |
| 5,905,457 A | 5/1999 | Rashid |
| 5,906,393 A | 5/1999 | Mazur et al. |
| 5,920,345 A | 7/1999 | Sauer |
| 5,926,126 A | 7/1999 | Engelman |
| 5,936,549 A | 8/1999 | Tsuchiya |
| 5,938,714 A | 8/1999 | Satonaka |
| 5,948,026 A | 9/1999 | Beemer, II. et al. |
| 5,949,366 A | 9/1999 | Herrmann |
| 5,949,918 A | 9/1999 | McCaffrey |
| 5,955,967 A | 9/1999 | Yamada |
| 5,959,552 A | 9/1999 | Cho |
| 5,963,272 A | 10/1999 | Wixson |
| 5,964,822 A | 10/1999 | Alland et al. |
| 5,983,161 A | 11/1999 | Lemelson et al. |
| 5,995,037 A | 11/1999 | Matsuda et al. |
| 5,999,117 A | 12/1999 | Engel |
| 5,999,874 A | 12/1999 | Winner et al. |
| 6,002,983 A | 12/1999 | Alland et al. |
| 6,018,308 A | 1/2000 | Shirai |
| 6,025,797 A | 2/2000 | Kawai et al. |
| 6,026,340 A | 2/2000 | Corrado et al. |
| 6,031,484 A | 2/2000 | Bullinger et al. |
| 6,037,860 A | 3/2000 | Zander et al. |
| 6,044,166 A | 3/2000 | Bassman et al. |
| 6,044,321 A | 3/2000 | Nakamura et al. |
| 6,049,619 A | 4/2000 | Anandan et al. |
| 6,061,105 A | 5/2000 | Sugimoto |
| 6,076,028 A | 6/2000 | Donnelly et al. |
| 6,084,508 A | 7/2000 | Mai et al. |
| 6,085,151 A | 7/2000 | Farmer et al. |
| 6,087,928 A | 7/2000 | Kleinberg et al. |
| 6,088,639 A | 7/2000 | Fayyad et al. |
| 6,094,159 A | 7/2000 | Osterfeld et al. |
| 6,097,332 A | 8/2000 | Crosby II |
| 6,114,951 A | 9/2000 | Knioshita et al. |
| 6,121,896 A | 9/2000 | Rahman |
| 6,148,943 A | 11/2000 | Kodaka et al. |
| 6,151,539 A | 11/2000 | Bergholz et al. |
| 6,157,892 A | 12/2000 | Hada et al. |
| 6,161,074 A | 12/2000 | Sielagoski et al. |
| 6,168,198 B1 | 1/2001 | Breed et al. |
| 6,169,479 B1 | 1/2001 | Boran et al. |
| 6,177,866 B1 | 1/2001 | O'Connell |
| 6,185,490 B1 | 2/2001 | Ferguson |
| 6,186,539 B1 | 2/2001 | Foo et al. |
| 6,188,316 B1 | 2/2001 | Matsuno et al. |
| 6,191,704 B1 | 2/2001 | Takenaga et al. |
| 6,204,756 B1 | 3/2001 | Senyk et al. |
| 6,209,909 B1 | 4/2001 | Breed |
| 6,218,960 B1 | 4/2001 | Ishikawa et al. |
| 6,219,606 B1 | 4/2001 | Wessels et al. |
| 6,223,125 B1 | 4/2001 | Hall |
| 6,225,918 B1 | 5/2001 | Kam |
| 6,226,389 B1 | 5/2001 | Lemelson et al. |
| 6,229,438 B1 | 5/2001 | Kutlucinar et al. |
| 6,246,961 B1 | 6/2001 | Sasaki et al. |
| 6,249,738 B1 | 6/2001 | Higashimata et al. |
| 6,256,584 B1 | 7/2001 | Kodaka et al. |
| 6,259,992 B1 | 7/2001 | Urai et al. |

VEHICLE SENSING BASED PRE-CRASH THREAT ASSESSMENT SYSTEM

RELATED APPLICATIONS

This application relates to application file number 201-0259 entitled "Remote Sensing Based Pre-Crash Threat Assessment System," which is filed simultaneously herewith and incorporated by reference herein.

TECHNICAL FIELD

The present invention relates generally to crash detection systems for automotive vehicles, and more particularly to a pre-crash threat assessment system for a crash detection system.

BACKGROUND ART

Due to the current density of traffic on the roads, motor vehicle operators are flooded with information. Consequently, operating a motor vehicle is a complex procedure in which various situations arise where the operator has limited, little, or no time to react or to manually engage safety measures.

Many previously known crash detection systems have incorporated crash detection algorithms based on sensed data. The application of remote sensing systems using radar, lidar, and vision based technologies for object detection, tracking, alarm processing, and potential safety countermeasure activation is well known in the art.

Based on range and bearing information provided by radar, lidar or vision based sensing systems and additional information obtained from the host vehicle sensors, various algorithms have been used to track the paths of host and target vehicles. Algorithms have also been incorporated to estimate the future position of obstacles or vehicles in the host vehicle path.

Safety systems, such as airbags and safety belt pretensioners, activate after physical contact occurs between two vehicles. A typical accident occurs within 90 ms, whereas a typical airbag deploys within approximately 70 ms. A typical motorized belt pretensioner requires about 200 ms to reduce the slack in the belt system. Through accident prediction, additional time for safety system activation is generated.

Currently, accident prediction algorithms are employed primarily for accident warning and avoidance and therefore typically cover ranges up to a few hundred meters ahead of the host vehicle. However, in unavoidable collision situations, the range under consideration is substantially short. Therefore, damage minimization techniques must predict an unavoidable collision and deploy safety measures within a short time.

The limitations associated with current accident damage minimization techniques have made it apparent that a new technique to minimize collision damage is needed. The new technique should predict a target vehicle position with respect to a host vehicle and should also substantially minimize the time between an anticipated unavoidable collision detection and subsequent activation of safety devices. The present invention is directed to these ends.

SUMMARY OF THE INVENTION

The present invention provides a remote, non-contact sensing based pre-crash threat assessment system. The present invention also provides a non-contact sensor-based pre-crash threat assessment system for an automobile.

In accordance with the present invention, a pre-crash assessment system, which includes a host vehicle in motion, is disclosed. A remote sensor (or sensing system), that detects a first target object dynamics, is coupled to the host object. Status monitoring sensors, that detect host object dynamics, are also coupled to the host object. A first safety device actuator, also coupled to the host object, activates a first safety device when a potential for crash is established such that a crash between the host object and the first target object is unavoidable. A first threshold for the first safety device actuator is defined by first safety device actuation criteria.

A safety device controller, which is coupled to the host object, generates tracking signals based on the host object dynamics and the first target object dynamics. The controller also estimates future positions of the host object and the first target object. The controller further estimates whether the potential for crash between the host object and the first target object is within the first threshold for the first safety device actuator. The safety device controller further controls the first safety device actuator based on the first threshold criteria and other safety device specific actuation criteria.

Advantages of the current invention are that remote sensing position and bearing information of a target object in the near vicinity of the host vehicle are used and threat assessment is made through a fast, robust and reliable algorithm. Fast algorithms allow more decision making time on the part of vehicle controllers and more deployment time for safety devices and are therefore preferable.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a pre-crash threat assessment and safety device activation system 1, particularly suited to the automotive field. The present invention is, however, applicable to various other uses that may require pre-crash threat assessment, as will be understood by one skilled in the art.

Figure 1:
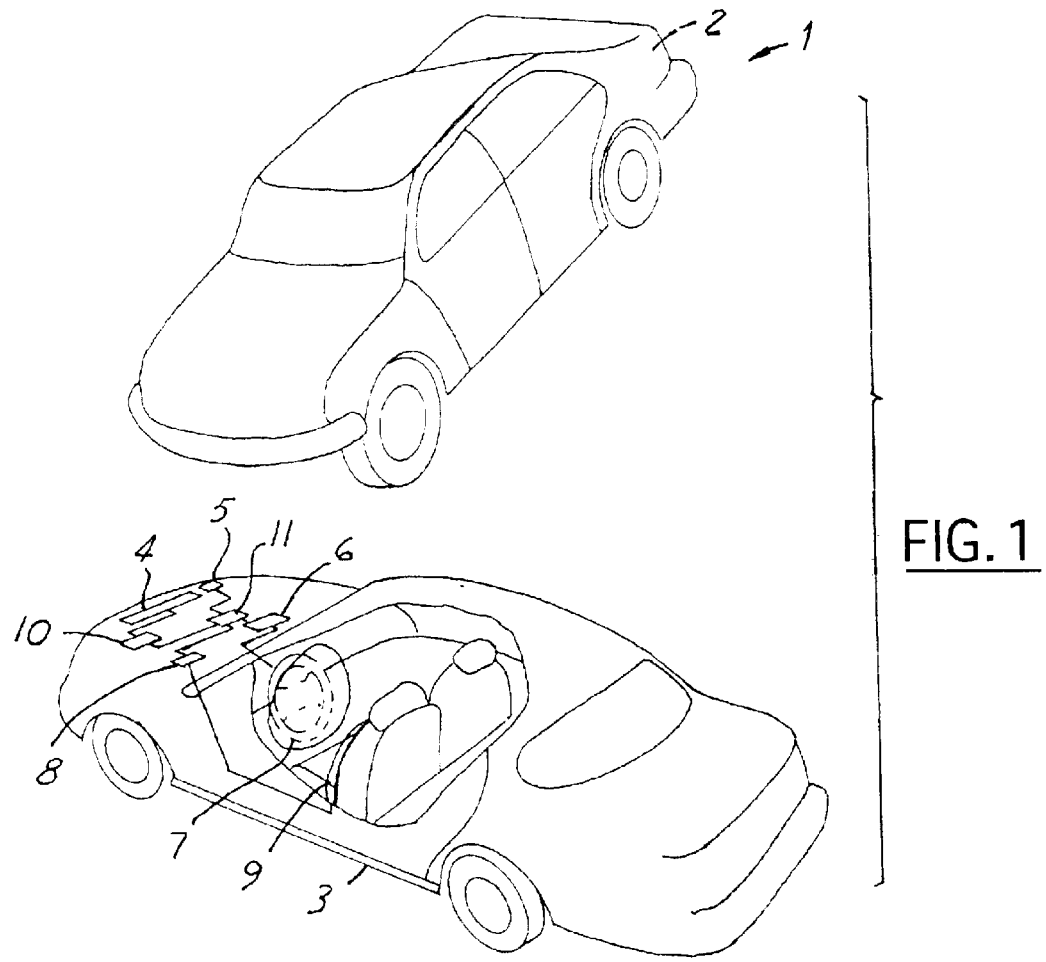
FIG. 1 is a pre-crash assessment system in accordance with a preferred embodiment of the present invention.

Referring to FIG. 1, a pre-crash assessment system 1, including a first target object (here illustrated as a first target vehicle 2) imminently colliding with a host object (here illustrated as a host vehicle 3), is illustrated. The first target object is an object, either stationary or in motion, that has a high potential for crash with the host vehicle 3. The high potential for crash is generally defined as an object on a collision path with and less than thirty meters (i.e. a near zone) from the host vehicle 3. The host object is an object in motion, mounted with at least one remote sensor. The pre-crash assessment system includes a high frequency remote sensor (or remote sensing system) 4 coupled to the host vehicle 3. The sensor (or sensing system) 4 detects vehicle states (dynamics) of the first target vehicle 2. Examples of vehicle states are position and velocity. The system 1 ideally includes at least one status monitoring sensor 5, such as: a yaw rate sensor, a steering wheel angle measuring sensor, and a vehicle speed sensing means, coupled to the host vehicle 3. The status monitoring sensors 5 provide information on the present states of the host vehicle 3, which are subsequently used by host vehicle systems, as will be discussed later.

The first safety device actuator 6 is coupled to the host vehicle 3. This actuator 6 activates the first safety device 7, here embodied as an airbag pre-arming system. The second safety device actuator 8 is also coupled to the host vehicle 3. The second safety device actuator 8 activates a second safety device 9, here embodied as a motorized safety belt pre-tensioner. It is important to note that numerous actuators and safety devices may be added to the system as needed by the manufacturer.

The safety device controller 10 is also coupled to the host vehicle 3. The remote sensing system detects the relative position of the target vehicle, as a function of time, with respect to the $X_1Y_1$ coordinate system attached at the front center-line of the host vehicle 3. The host vehicle sensing system 5 detects the host vehicle dynamics in terms of the XY coordinate system, centered at the instantaneous center of rotation (A) of the host vehicle 3. From the above information, the safety device controller 10 generates a tracking signal for the target vehicle 2 in the XY coordinate system, as explained in detail later. From the tracking signals of target and host vehicles in the XY coordinate system, the controller 10 predicts the future positions of the host and target vehicles, in the XY coordinate system, at a specific future time. From this information, the controller 10 estimates the position of the nearest scattering center on the target vehicle with respect to the host vehicle in the $X_1Y_1$ coordinate system.

Each individual safety device has a substantially unique time requirement to become fully effective, and the decision to activate a particular safety device takes this unique time requirement into consideration. For example, the activation decision time for motorized belt pre-tensioners is earlier than for pre-arming airbags due to relatively longer deployment time requirements for the motorized belt pre-tensioners.

The controller 10 estimates the future position of the target vehicle 2, with respect to the host vehicle 3, at each of the activation times, which correspond to the safety devices under consideration. The controller 10 estimates whether a potential for crash between the host vehicle 3 and the first target vehicle 2 is within the first threshold criteria for the first safety device actuator 6, based on the activation time considerations of the first safety device. The controller 10 also estimates whether a potential for crash between the host vehicle 3 and the first target vehicle 2 is within the second threshold criteria for the second safety device actuator 8, based on the activation time considerations of the second safety device. In the current embodiment, the assessment is made by comparing the predicted x and y coordinates of the nearest scattering center on the target vehicle 2 with respect to the host vehicle 3 in the $X_1Y_1$ coordinate system at a device specific future time. Different tolerance values can be used for x and y coordinate threshold comparisons and also for individual safety device activation criteria, as will be explained later. The safety device controller 10 further sends control signals to the host vehicle Controller Area Network Bus (CAN) 11, which controls the first safety device actuator 6 and the second safety device actuator 8 based on threat assessment evaluations, as will be understood by one skilled in the art. The operations of the controller 10 will be discussed in detail later.

Figure 2:
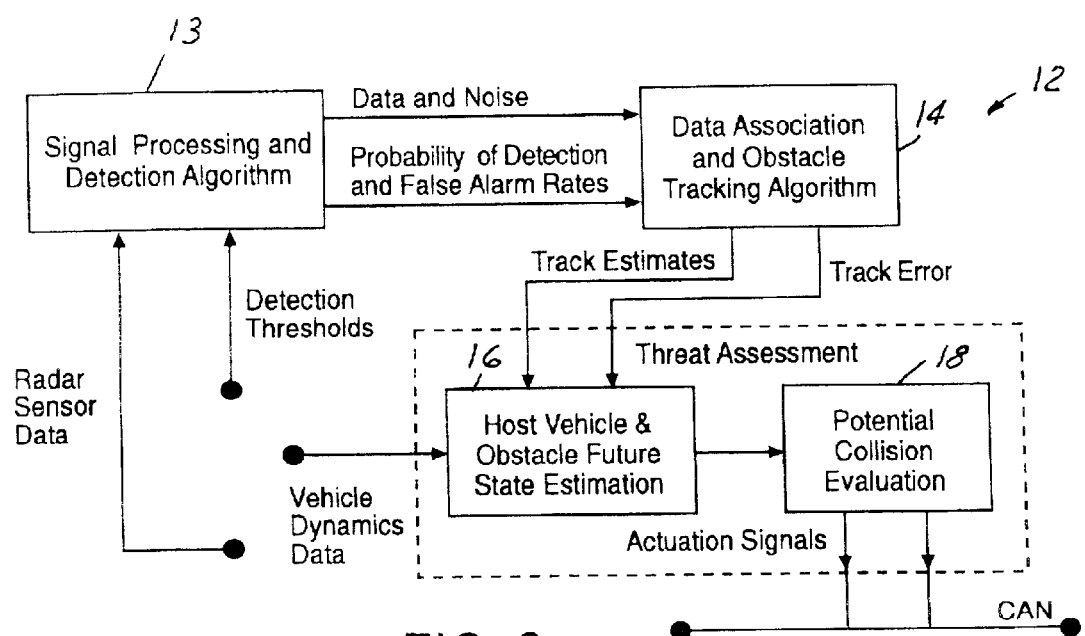
FIG. 2 is a block diagram of a remote sensing based pre-crash threat assessment system in accordance with a preferred embodiment of the present invention.

Referring to FIG. 2, a block diagram of the remote sensing based pre-crash threat assessment system 12, is illustrated. The current invention addresses only threat assessment aspects of the system 12 (for pre-crash sensing purposes) with radar, lidar, or vision sensor based remote sensing systems.

The system 12 starts when operation block 13, which engages signal processing and detection algorithms, receives radar sensor data and predetermined detection thresholds. The radar sensor data is generated when an object impedes the radar pulse and reflects the pulse back to the radar sensor on the host vehicle. The detection thresholds are pre-set based on acceptable probability of detection and false alarm rates. Subsequently, operation block 13 sends the data and noise accompanying the signal, as will be understood by one skilled in the art, to operation block 14. The probability of detection and false alarm rates have significant effects on items such as track initiation and track quality.

Operation block 14 associates the data from operation block 13 and engages an obstacle tracking algorithm. Operation block 14 then sends the track estimates of the object, which is on a potential collision course with the host vehicle, and further sends the tracking error estimate signals to operation block 16, as will be understood by one skilled in the art. Host vehicle dynamic data, from the host vehicle dynamic sensing systems, is also sent to the operating block 16.

Using this combination of received data, operation block 16 estimates the future states (positions) of the host vehicle and target vehicle and sends this data to operation block 18. An evaluation is then made in operation block 18 of the potential for collision of the host vehicle and the target vehicle. Operation blocks 16 and 18 are the threat assessment components of the system 12, which will be discussed in detail later. Subsequently, operation block 18 sends actuation signals to the Controller Area Network Bus (CAN) of the host vehicle, which engages the safety devices (countermeasures), as will be understood by one skilled in the art.

This invention is especially suitable for applications which require relatively longer countermeasure deployment times, such as: motorized belt pre-tensioners, and certain countermeasures under consideration for vehicle-to-vehicle collision compatibility, such as: vehicle nose-dipping and bumper airbags. The current invention uses host vehicle mounted remote sensing systems, such as: radar based remote sensing systems, with wide fields of coverage, in the proximity of the host vehicle. The invention further uses host vehicle status monitoring sensors and remote sensors to accurately predict the future positions of both the host vehicle and the target vehicle and to assess future collision probabilities. These estimated collision probabilities are used with application specific countermeasure deployment logic to activate appropriate countermeasures, for accident damage mitigation.

Figure 3:
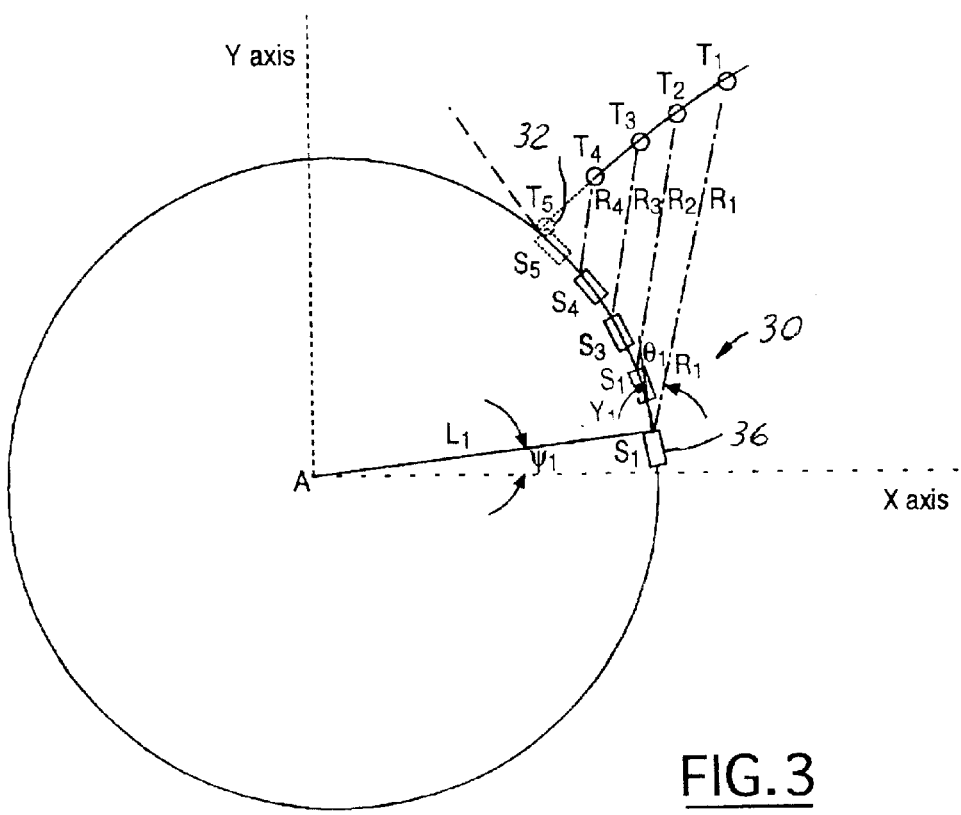
FIG. 3 is an exemplary illustration of a pre-crash scenario in accordance with a preferred embodiment of the present invention.
Figure 4:
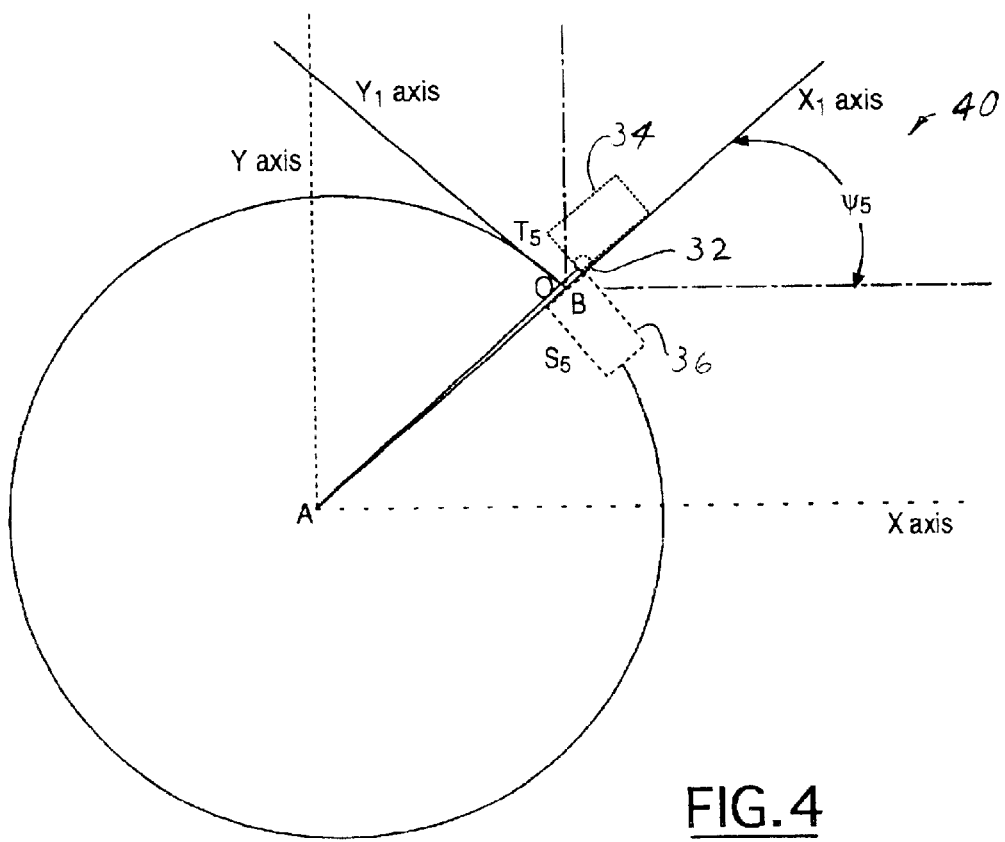
FIG. 4 is an exemplary illustration of a crash scenario in accordance with a preferred embodiment of the present invention.

The embodied approach is further clarified in FIGS. 3 and 4, which illustrate an example of a pre-crash scenario 30 and a crash scenario 40 respectively. $S_1, S_2, S_3, S_4$, and $S_5$ are the positions of the host vehicle 36 at five consecutive times: $t_1, t_2, t_3, t_4$, and $t_5$ ($t_5$ is the approximate crash time). $T_1, T_2, T_3, T_4$ and $T_5$ are the positions of the nearest scattering center 32 on one of the target vehicles being tracked with the remote sensing system, which is mounted on the host vehicle 36. Multiple scattering centers on multiple objects are tracked, but only the nearest scattering center 32 on one of the target vehicles is shown to illustrate the approach. R is the radial distance, and θ is the angle made by the nearest scattering center 32 on the target vehicle 34 with the $Y_1$ axis of the $X_1Y_1$ coordinate system. The $Y_1$-axis of a coordinate system (with origin at 0) is aligned with the front central line of the host vehicle 36 and moves with the host vehicle 36. The x and y coordinates of the nearest scattering center 32 on the target vehicle 34, in the $X_1Y_1$ Cartesian coordinate system moving with the host vehicle 36, are obtained by:

$X_1 = R_1 * \sin(\theta_1)$ at time $t_1$, $X_2 = R_2 * \sin(\theta_2)$ at time $t_2$, $X_3 = R_3 * \sin(\theta_3)$ at time $t_3$, $X_4 = R_4 * \sin(\theta_4)$ at time $t_4$, $X_5 = R_5 * \sin(\theta_5)$ at time $t_5$, $Y_1 = R_1 * \cos(\theta_1)$ at time $t_1$, $Y_2 = R_2 * \cos(\theta_2)$ at time $t_2$, $Y_3 = R_3 * \cos(\theta_3)$ at time $t_3$, $Y_4 = R_4 * \cos(\theta_4)$ at time $t_4$, and $Y_5 = R_5 * \cos(\theta_5)$ at time $t_5$.

The host vehicle coordinates at times $t_1, t_2, t_3, t_4$, and $t_5$, in the XY coordinate system, which are fixed at point A (the instantaneous center of rotation of the host vehicle 36) are obtained by:

$X_{St1} = L_1 * \cos(\dot{\Psi} * t_1)$, $X_{St2} = L_2 * \cos(\dot{\Psi} * t_2)$, $X_{St3} = L_3 * \cos(\dot{\Psi} * t_3)$, $X_{St4} = L_4 * \cos(\dot{\Psi} * t_4)$, $X_{St5} = L_5 * \cos(\dot{\Psi} * t_5)$, $X_{St1} = L_1 * \sin(\dot{\Psi} * t_1)$, $X_{St2} = L_2 * \sin(\dot{\Psi} * t_2)$, $X_{St3} = L_3 * \sin(\dot{\Psi} * t_3)$, $X_{St4} = L_4 * \sin(\dot{\Psi} * t_4)$, and $X_{St5} = L_5 * \sin(\dot{\Psi} * t_5)$.

$\dot{\Psi}$ is the host vehicle yaw rate. The instantaneous radius of curvature, $L_1$, is obtained by $(V_1/\dot{\Psi})$, where $V_1$ is the host vehicle velocity. Generally, the yaw rate $\dot{\Psi}$ update rate is slower than the remote sensing system update rate. Also, times $t_1, t_2, t_3, t_4$, and $t_5$ are measured from the latest yaw rate ($\dot{\Psi}$) update time, which is used to calculate the latest instantaneous center of rotation (A) and the radius of curvature ($L_1$).

Also, the host vehicle coordinates (in the XY coordinate system with origin at A), at a future time ($\Delta t$) from time $t_4$ are obtained from the latest yaw rate through the following formulas:

$$X_{S\Delta t} = L_1 * \cos(\dot{\Psi} * (\Delta t + t_4)) \text{ and}$$

$$Y_{S\Delta t} = L_1 * \sin(\dot{\Psi} * (\Delta t + t_4)).$$

From the above equations, the nearest scattering center coordinates on the target vehicle, in the XY coordinate system with center at A, at times $t_1, t_2, t_3, t_4$, and $t_5$, measured from the latest yaw rate update, are obtained from the following equations:

$X_{Tt1} = X_1' + X_{St1}$, $X_{Tt2} = X_2' + X_{St2}$, $X_{Tt3} = X_3' + X_{St3}$, $X_{Tt4} = X_4' + X_{St4}$, $X_{Tt5} = X_5' + X_{St5}$, $Y_{Tt1} = Y_1' + Y_{St1}$, $Y_{Tt2} = Y_2' + Y_{St2}$, $Y_{Tt3} = Y_3' + Y_{St3}$, $Y_{Tt4} = Y_4' + Y_{St4}$, and $Y_{Tt5} = Y_5' + Y_{St5}$, Where $X_1', X_2', X_3', X_4', X_5', Y_1', Y_2', Y_3', Y_4$ and $Y_5'$, are obtained from $X_1, X_2, X_3, X_4, X_5, Y_1, Y_2, Y_3, Y_4$ and $Y_5$ by the coordinate transformations between $X_1Y_1$ and XY coordinate systems at times $t_1, t_2, t_3, t_4$ and $t_5$. For example, the transformation equation for time $t_1$ is shown below:

$$\begin{bmatrix} X_1' \\ Y_1' \end{bmatrix} = \begin{bmatrix} \cos(\dot{\Psi} * t_1) & -\sin(\dot{\Psi} * t_1) \\ \sin(\dot{\Psi} * t_1) & \cos(\dot{\Psi} * t_1) \end{bmatrix} \begin{bmatrix} X_1 \\ Y_1 \end{bmatrix}.$$

From the x and y coordinates (at time $t_1, t_2, t_3, t_4$, and $t_5$) for the nearest scattering center 32 on the target vehicle 34 in the XY coordinate system, the x and y components of velocities and accelerations at time $t_4$, are calculated by numerical techniques.

These x and y components of velocity and acceleration are used to predict the future position of the nearest scattering center 32 on the target vehicle in the XY coordinate system, at a future time ($\Delta t$), from time $t_4$, from the following equations of motion:

$$X_{T\Delta t} = X_{Tt4} + V_{Xt4} * (\Delta t) + 0.5 * A_{Xt4} * (\Delta t)^2 \text{ and}$$

$$Y_{T\Delta t} = Y_{Tt4} + V_{Yt4} * (\Delta t) + 0.5 * A_{Yt4} * (\Delta t)^2.$$

$V_{Xt4}, A_{Xt4}, V_{Yt4}, A_{Yt4}$ are velocity and acceleration components in X and Y directions (XY coordinate system with origin at A). n alternate embodiments of the current invention, different advanced filtering techniques such as: Alpha-Beta-Gamma Filtering, Kalman Filtering, and Adaptive Kalman filtering are used to account for the noise in the sensor signals and to track and accurately predict the future position of the host and target vehicles.

From the position and orientation of the host vehicle 36 and the position of the target vehicle 34 (in the XY coordinate system, at a future time ($\Delta t$)), the position of the nearest scattering center on the target vehicle (with respect to the $X_1Y_1$ coordinate system attached to the host vehicle 36), at a future time ($\Delta t$), is calculated through the coordinate transformation:

$$\begin{bmatrix} X_{\Delta t} \\ Y_{\Delta t} \end{bmatrix} = \begin{bmatrix} \cos(\Psi*(\Delta t*t_4)) & \sin(\Psi*(\Delta t+t_4)) \\ -\sin(\Psi*(\Delta t+t_4)) & \cos(\Psi*(\Delta t+t_4)) \end{bmatrix} \begin{bmatrix} (X_{T\Delta t} - X_{S\Delta t}) \\ (Y_{T\Delta t} - Y_{S\Delta t}) \end{bmatrix}.$$

The position of the nearest scattering center 32 with respect to the coordinate system $X_1Y_1$ attached to the front of the host vehicle at a future time ($\Delta t$) from $t_4$ is used to assess the threat of collision. Device specific threshold criteria in conjunction with safety device specific activation logic are used to tailor activation of suitable countermeasures. The threshold criteria are given by:

$$|X_{\Delta t}| \leq \left(\frac{W_S}{a} + b\right) \text{ and}$$

$$-(L_S + c) \leq Y_{\Delta t} \leq d.$$

$W_s$ and $L_s$ are respectively the width and length of the host vehicle 36. User defined variables are represented by a, b, c and d.

Figure 5:
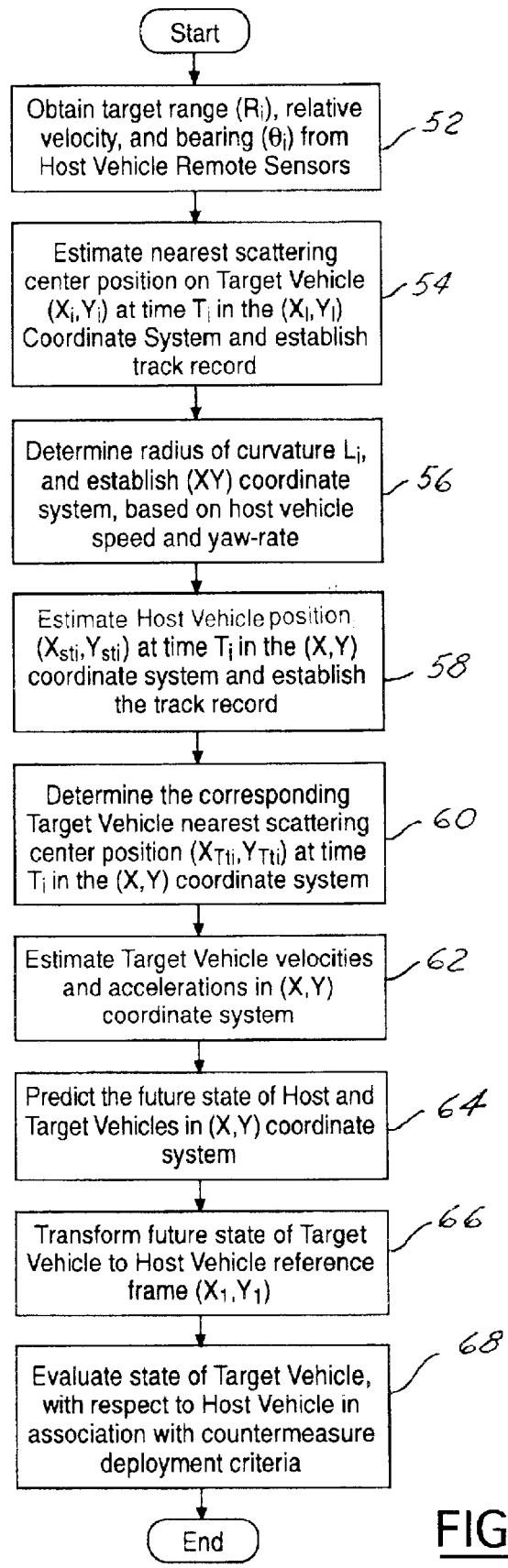
FIG. 5 is a block diagram of a pre-crash threat assessment and safety device activation system in accordance with a preferred embodiment of the present invention.

In FIG. 5, in view of FIGS. 1, 2, 3 and 4, a block diagram of the operation of a pre-crash threat assessment and safety device activation system, in accordance with one embodiment of the present invention, is illustrated.

The logic starts in operation block 52 by obtaining the range ($R_i$) and the bearing ($\theta_i$) of the first target object from the host vehicle remote sensor. Subsequently, operation block 54 activates and the nearest scattering center on the target object ($X_i, Y_i$), in the $X_1Y_1$ coordinate system, is estimated; and the first target object track record is updated from the data sent from operation block 52.

Operation block 56 then activates and the radius of curvature ($L_i$) is determined and the XY coordinate system is established based on host vehicle speed and yaw rate. Subsequently, operation block 58 activates and logic operates, as discussed in reference to FIGS. 3 and 4, to estimate the host vehicle position ($X_{St1}$, $Y_{St1}$) at time $t_1$, in the XY coordinate system. Subsequent estimations are conducted to track the host vehicle position.

Operation block 60 then activates and the controller determines the nearest scattering center position ($X_{Tt1}, Y_{Tt1}$) of the first target vehicle at time $t_1$, in the XY coordinate system. Operation block 62, logic, as discussed in reference to FIGS. 3 and 4, then operates to estimate the first target vehicle velocity and accelerations in the XY coordinate system. Subsequent estimations are conducted to track the first target vehicle velocities and accelerations in XY coordinate system.

Operation block 64 then activates to predict, through the equations previously mentioned, the future state of the host and first target vehicles in the XY coordinate system. The prediction of the first target vehicle is transformed into the host vehicle reference coordinate system $X_1Y_1$ in operation block 66. Finally, in operation block 68, the state of the first target vehicle is evaluated with respect to the host vehicle, and requirements for countermeasure activation are assessed.

The current embodiment combines this efficient approach for threat assessment with advanced tracking and filtering techniques, such as: Alpha-Beta-Gamma Filtering, Kalman Filtering, and Adaptive Kalman Filtering techniques, as will be understood by one skilled in the art. These filtering techniques improve the reliability, robustness and confidence levels of the threat assessment predictions, without significantly sacrificing processing speeds, as will be understood by one skilled in the art.

In operation, the yaw rate sensor and the vehicle speed sensors on the host vehicle are used to track the position of the host vehicle in the XY coordinate system, which is located at the instantaneous center of rotation of the host vehicle. In response to these signals, logic operates within the controller to track the position, velocity and acceleration of the host vehicle and to calculate a future position of the host vehicle in the XY coordinate system. When a first target object comes in the range of the radar sensor on the host vehicle, logic operates to track the target object and estimate the target object velocity, acceleration and future position with respect to the XY coordinate system. A calculation is then made to obtain the relative position of the target vehicle with respect to the host vehicle at a future time in the host vehicle-based coordinate system ($x_1Y_1$ coordinate system). Relative position information in the $X_1Y_1$ coordinate system, corresponding to the activation decision times of the individual safety devices, is compared to safety device specific tolerance criteria. The threshold comparison, along with safety device specific activation criteria, is used, by the controller, to send the signal to activate the safety device.

From the foregoing, it can be seen that there has been brought to the art a new non-contact and vehicle sensing based pre-crash threat assessment system. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. A pre-crash assessment system, having a first target object in a near zone of a host object in motion, comprising:

a remote sensor coupled to the host object for detecting a first target object dynamic;

a status monitoring sensor coupled to the host object for detecting a host object dynamic;

a first safety device actuator, coupled to the host object, for activating a first safety device;

a first safety device activation specification defining a first threshold for said first safety device actuator; and a safety device controller, coupled to the host object for generating a threshold criteria assessment based on said host object dynamic and said first target object dynamic, said controller estimating future positions of the host object and the first target object, said controller further estimating whether a potential for crash between the host object and the first target object is within said first threshold for said first safety device actuator, said safety device controller further controlling said first safety device actuator in response to said threshold criteria assessment.

2. The system of claim 1, further comprising multiple target objects in the near zone of the host object.

3. The system of claim 1, wherein said controller further comprises a tracking filter.

4. The system of claim 1, wherein an airbag comprises said first safety device.

5. The system of claim 1, wherein a motorized safety belt pre-tensioner comprises said first safety device.

6. The system of claim 1, wherein a lidar sensor comprises said remote sensor.

7. The system of claim 1, wherein a radar sensing system comprises said remote sensor.

8. A method for pre-crash threat assessment for a host vehicle in motion, comprising:
   sensing a first target vehicle in a near zone of the host vehicle;
   tracking said first target vehicle;
   estimating a first target vehicle dynamic;
   calculating a future position of said first target vehicle from said current first target vehicle dynamic;
   sensing the host vehicle in motion;
   tracking a current host vehicle dynamic;
   estimating a future host vehicle dynamic based on said current host vehicle dynamic;
   calculating a future position of the host vehicle from said current host vehicle dynamic;
   calculating a potential for collision between the host vehicle and said first target vehicle; and
   determining whether said potential for collision of the host vehicle and said first target vehicle is within a pre-determined safety threshold.

9. The method of claim 8, wherein said step of sensing further comprises the step of sensing a plurality of target vehicles in said near zone of the host vehicle.

10. The method of claim 8, wherein said step of calculating a future position of said first target vehicle further comprises the step of filtering future positions of said first target vehicle.

11. The method of claim 8 wherein said step of estimating further comprises the step of estimating acceleration of said first target vehicle.

12. The method of claim 8, wherein said step of determining further comprises the step of determining whether said potential for collision of the host vehicle and said first target vehicle is within a second safety device activation threshold.

13. A pre-crash assessment system, having a first target vehicle in a near zone of a host vehicle, comprising:
   a high frequency remote sensor, coupled to the host vehicle, for detecting a first target vehicle dynamic;
   a status monitoring sensor coupled to the host vehicle for detecting a host vehicle dynamic;
   a first safety device actuator, coupled to the host vehicle for activating a first safety device;
   a first safety device activation specification defining a first threshold for said first safety device actuator;
   a second safety device actuator, coupled to the host vehicle, for activating a second safety device; and
   a second safety device activation specification defining a second threshold for said second safety device actuator;
   a safety device controller, coupled to the host vehicle for generating a tracking signal based on said first target vehicle dynamic and said host vehicle dynamic, said controller estimating future positions of the host vehicle and the first target vehicle, said controller further estimating whether a potential for crash between the host vehicle and the first target vehicle is within said first threshold for said first safety device actuator, thereby defining a first threshold assessment, and said controller further estimating whether said potential for crash between the host vehicle and the first target vehicle is within said second threshold for said second safety device actuator, thereby defining a second threshold assessment, said safety device controller further controlling said first safety device actuator in response to said first threshold assessment and said second safety device actuator in response to said second threshold assessment.

14. The system of claim 13, further comprising multiple target objects in the near zone of the host vehicle.

15. The system of claim 13, wherein a controller further comprises said tracking filter.

16. The system of claim 13, wherein an airbag comprises said first safety device.

17. The system of claim 13, wherein a motorized safety belt pre-tensioner comprises said second safety device.

18. The system of claim 13, wherein a lidar sensor comprises said high frequency remote sensor.

19. The system of claim 13, wherein a radar sensing system comprises said high frequency remote sensor.

* * * * *